US012647654B2

(12) United States Patent
Bhalla et al.

(10) Patent No.: US 12,647,654 B2
(45) Date of Patent: Jun. 2, 2026

(54) UPDATE STREAMING APPLICATION SOFTWARE

(71) Applicant: ServiceNow, Inc., Santa Clara, CA (US)

(72) Inventors: Vivan Bhalla, Jersey City, NJ (US); Santosh Surganiya, Hyderabad (IN); Vandhana Narayanan, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 32 days.

(21) Appl. No.: 18/545,793

(22) Filed: Dec. 19, 2023

(65) Prior Publication Data

US 2025/0203167 A1    Jun. 19, 2025

(51) Int. Cl.
| | |
|---|---|
| *H04N 21/4722* | (2011.01) |
| *G06F 16/953* | (2019.01) |
| *G06F 40/40* | (2020.01) |

(52) U.S. Cl.
CPC ....... *H04N 21/4722* (2013.01); *G06F 16/953* (2019.01); *G06F 40/40* (2020.01)

(58) Field of Classification Search
CPC .... H04N 21/4722; G06F 16/953; G06F 40/40
See application file for complete search history.

(56) References Cited

U.S. PATENT DOCUMENTS

| | | | | |
|---|---|---|---|---|
| 7,765,462 | B2 | 7/2010 | Dey et al. | |
| 9,785,651 | B2 | 10/2017 | Boncyk et al. | |
| 2007/0005338 | A1* | 1/2007 | Vrijsen | H04N 21/4331 |
| | | | | 704/E15.045 |
| 2012/0262533 | A1* | 10/2012 | Gannu | H04M 3/567 |
| | | | | 704/E15.005 |
| 2012/0304065 | A1 | 11/2012 | Cai | |
| 2016/0337413 | A1* | 11/2016 | Sallam | G06F 16/433 |
| 2017/0316708 | A1* | 11/2017 | Harb | H04N 21/4333 |
| 2020/0372113 | A1* | 11/2020 | Thomas | G06F 16/13 |
| 2021/0374162 | A1* | 12/2021 | Kirdey | G06F 40/30 |
| 2024/0354336 | A1* | 10/2024 | Gopalkrishna | G06V 10/761 |
| 2024/0420085 | A1* | 12/2024 | Fox | G10L 15/1815 |

OTHER PUBLICATIONS

Apple, "iPhone User Guide—Use Live Text to Interact with Content in a Photo or Video on iPhone," May 18, 2023 [retrieved Mar. 27, 2024 from https://support.apple.com/en-in/guide/iphone/iph37fdd714b/ios], 4 pages.

* cited by examiner

*Primary Examiner* — Pinkal R Chokshi
(74) *Attorney, Agent, or Firm* — FLETCHER YODER PC

(57) ABSTRACT

Techniques described herein are related to updating streaming application software. For example, data from the streaming application software are transformed into a format for an engine to generate one or more results. The one or more results may comprise information related to the data from the streaming application software.

20 Claims, 5 Drawing Sheets

300

Identify a portion of data from a streaming application

302

Transform The Portion Of Data

304

Generate Search Query

306

Cause Search Engine To Execute Search Query

308

Obtain Results

310

UPDATE STREAMING APPLICATION SOFTWARE

TECHNICAL FIELD

The present disclosure relates to obtaining search results related to content used by one or more streaming applications, and in particular searching for information related to the content.

BACKGROUND

In modern computing systems and environments, and as businesses increasingly rely on technology for their day-to-day operations, streaming applications are becoming more prevalent as platforms for delivering new information (e.g., streaming video content, learning sessions, Information Technology (IT) support, and/or business meetings). Users of streaming applications may lack knowledge to the content appearing during these sessions and it is often difficult for the user to find information related to the content while in these sessions.

BRIEF DESCRIPTION OF THE DRAWINGS

Various embodiments in accordance with the present disclosure will be described with reference to the drawings, in which.

DETAILED DESCRIPTION

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

Current streaming applications do not have a way for a user to obtain search results on information related to certain terminology used, for example, during a meeting, without the user having to leave the streaming application and generate a search query using another application. For example, during a meeting, if a technical term is discussed and a user desires to obtain a definition of the term, the user would need to leave the streaming application (e.g., minimize the streaming application and open a browser) to conduct a search on this term using a searching engine (e.g., via a large language model (LLM)) to find its meaning. Streaming applications currently are not configured to allow a user to select specific term(s) used during the meeting and perform a search on the terms to obtain search results on its meaning without having to leave the streaming application.

Techniques described herein disclose systems and methods to enable obtaining search results comprising information related to content identified from live streams, meetings, or recorded presentations. In an embodiment, a software program is implemented and can be executed by a system so that a search functionality is integrated into a streaming application. In an embodiment, portions of data for which information about the data is desired are selected from the streaming session, then the portions of data (e.g., selected text and/or audio) are transformed to searchable text using language processing techniques, such as natural language processing (NLP). The output from the NLP may be used as input (e.g., as a search query) for a search engine, and the search results associated with the selected text/audio may be provided back to the software such that the user device can display the search results in the streaming session. Integration of a search functionality in streaming applications may enable a user to, while continuing to participate in a streaming session or meeting, search for and obtain information associated with the streaming content.

Figure 1:
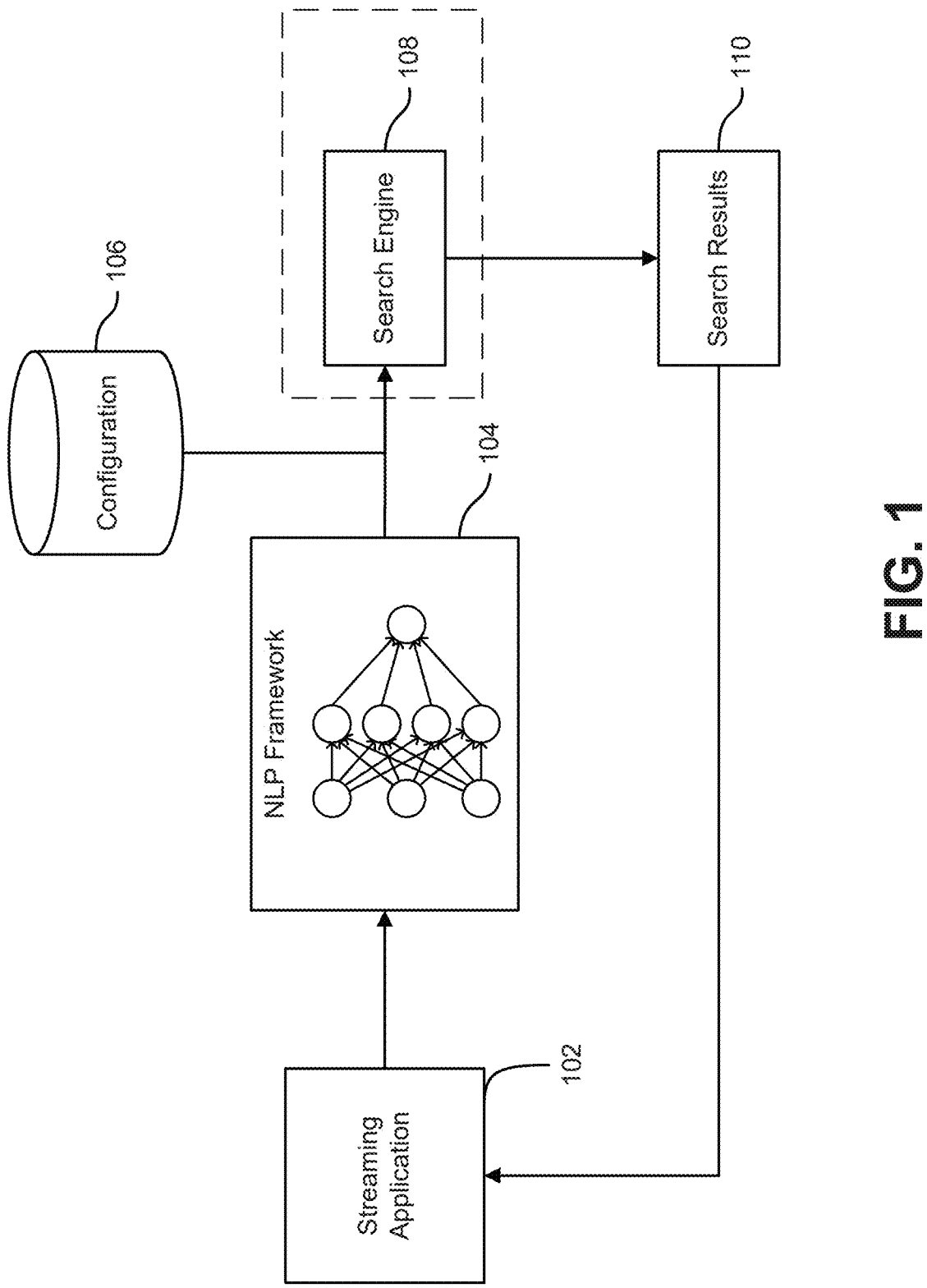
FIG. 1 illustrates a system that integrates content search functionality into a streaming application, in accordance with an embodiment.

FIG. 1 is a block diagram illustrating system 100 that integrates content search functionality into a streaming application, in accordance with an embodiment. In at least one embodiment, system 100 comprises one or more processers that execute a streaming application 102 (also referred to herein as a data streaming application or streaming application software) to stream one or more forms of content, an NLP framework 104, and configuration 106. In at least one embodiment, one or more search queries generated by the NLP framework 104 is sent to a search engine 108 (which may be separate from system 100 and hosted by another system) where one or more search results 110 are obtained. In at least one embodiment, software is implemented and to be executed by system 100 such that a streaming application 102 is updated with a content search functionality.

In at least one embodiment, system 100 is a collection of one or more hardware and/or software resources with instructions that, when executed, integrates content search functionality into a streaming application as described herein. In an embodiment, system 100 enables users to select content from within a streaming application, to search for information about the selected content via a search engine, and view results on the search while still present in the streaming application. In an embodiment, information related to the content includes but is not limited to: a meaning of the content, a definition of the content, explanation, description, articles about the content, and/or other additional information regarding the substance of the searched content. In an embodiment, content is selected by a user participating in a meeting. The user may identify portions of data from the data streaming application hosting the meeting. The user may parse through a log file (e.g., application logs, log data, log streaming, etc.) to determine which portions of data are to be selected for a search. In another embodiment, a user can highlight text from the streaming application and use the text as the basis for the NLP framework 104 to generate a search query. In an embodiment, content from a data streaming application comprises a text transcript, audio, video, image data, files, documents, any combination thereof, or any other relevant data associated a streaming application such as code or instructions to be executed by one or more processors.

In an embodiment, system 100 receives one or more instructions from a user (not depicted here in FIG. 1 but described in more detail in FIG. 2) of a streaming application 102 to select content. As mentioned above, content can be selected by a user selecting data from a log file, highlighting text from the streaming application, and/or using a playback recording from the audio data. Once the content is selected, the system 100 may determine that the content satisfies one or more search initiation conditions. A search initiation condition can include one more conditions that need to be satisfied for the system 100 to identify and further select a portion of data to be used for a search. For example, a search initiation condition is satisfied when a user selects content (e.g., by highlighting text or by instructing the device to extract playback audio data) from a streaming application. In at least one embodiment, the software in the streaming application is updated and configured to allow a user to input and use certain functions in the streaming application to indicate a search to be performed on data from the streaming application. For example, while in a meeting, a user can input "Ctrl+Shift+LeftArrow" (or some variation thereof) and then select the last five seconds of content for the NLP framework 104 to use as searchable content. That is, the streaming application 102, while executing the software, may convert the last five seconds of content into text and then provide the text to the NLP framework 104, which will then translate the text into a searchable query. In another embodiment, a search initiation condition is triggered independent of user input and is satisfied if certain words in the streaming application are spoken or used. For example, in a meeting, certain technical terms are used to discuss a product, so the software can automatically detect that the technical term is something unbeknownst to the individuals that are participating in the meeting. This technical term is then provided to the NLP framework 104 such that search results on the definition or information related to the technical term is provided back to the users of the meeting. This way, a user does not need to select the content and the search query will be generated based on data presented in a meeting.

In an embodiment, selected content is transformed, using Natural Language Processing (NLP) techniques, into a search query that may be executed by a search engine. In an embodiment, search queries are executed by search engines which have been identified by system 100 via configuration 106. For example, configuration 106 may be software (e.g., part of the same software indicated above) that, when executed, determines which search engine to use to provide results for the search query generated by NLP framework 104. In some embodiments, configuration 106 will direct search queries to a large language model (LLM). In other embodiments, configuration 106 will direct search queries to an internal database that only users of the meeting have access to as the search query may be a term that is only used internally and not outside of the company. In an embodiment, results from the search are obtained, and used by one or more user devices to display the results while using the streaming application. Configuration 106 may, when executed by the system, determine from the type of streaming application, the type of meeting taking place, and/or the users participating in the streaming application which search engine the search query should be sent to.

In at least one embodiment, system 100 is a software program executing on computer hardware, application executing on computer hardware, and/or variations thereof. In at least one embodiment, one or more processes of system

100 are performed by any suitable processing system or unit (e.g., graphics processing unit (GPU), general-purpose GPU (GPGPU), parallel processing unit (PPU), central processing unit (CPU)), a data processing unit (DPU), such as described below, and in any suitable manner, including sequential, parallel, and/or variations thereof. In at least one embodiment, system 100 uses a machine learning training framework, and/or other training framework to implement and perform operations described herein to use one or more neural networks or machine learning model, to generate one or more portions of a response or perform one or more processes discussed herein. In at least one embodiment, as an example, training a neural network model comprises use of a server, which further includes at least a GPU, an optimizer, or discriminator architecture.

In at least one embodiment, streaming application 102 comprises software that, when executed by the system, streams and shares content. In at least one embodiment, streaming application 102 enables live streaming of content by one or more users. In at least one embodiment, streaming application 102 comprises a collaboration and communication platform. In at least one embodiment, streaming application 102 comprises a cloud platform that hosts one or more users from different locations. In at least one embodiment, streaming application 102 uses a network, internet, intranet, any combination thereof, or any other network described to communicate with one or more users or client devices. In at least one embodiment, content comprises data from streaming application 102. In at least one embodiment, streaming application 102 is a video meeting, a presentation recording, a chatroom, a live video call with a customer support agent, a webinar, audio file, virtual meetings, virtual support sessions, remote management of software and/or hardware, virtual workspaces, voice over internet protocol, audio or video conferencing, or any combination thereof.

In at least one embodiment, NLP framework 104, when executed by the system 100, transforms a portion of data to text via a natural language processing model or large language model. The NLP framework 104 may generate a search query, based at least in part on the content selected from the streaming application 102. In an embodiment, NLP framework 104 includes a process for recognizing patterns in content, processing recognized patterns, and outputting data. In an embodiment, NLP framework 104 receives content, processes content to recognize features in the content as speech, interpret the speech as meaningful based on contest, and classify the speech from the content into a format. In at least one embodiment, content comprises a portion of data from a data streaming application.

In at least one embodiment, NLP framework 104 receives content as input and generates a search query using one or more machine learning algorithms, deep learning algorithms, neural networks, or any combination thereof. In an embodiment, a search query comprises text to be executed by one or more search engines to generate one or more search results. In an embodiment, search queries comprise letters, text, phrases, keyword combinations, numbers, punctuation, paragraphs, grammar, sentence spacing, names, designations, any combination thereof, or any other relevant query output by an NLP. In at least one embodiment, NLP framework 104 comprises a portion for conducting sentiment analysis or a similar process, and another portion for conducting classification analysis or a similar process. In an embodiment, NLP framework 104 comprises computing hardware components, software components, cloud services, neural networks, machine learning models, any combination thereof, or any other component typically included in an NLP framework 104.

In an embodiment, configuration 106 comprises programs with instructions which determined which of the one or more search engines 108 is to be selected to execute search queries. In an embodiment, configurations 106, when executed by the system 100, identifies one or more search engines 108 to use to search for a meaning related to the portions of data from a streaming application 102. In an embodiment, portions of data are selected and transformed into text queries using NLP framework 104. In an embodiment, configuration 106, when executed by the system 100, compiles a list of search engines 108 which are approved and not approved to execute a search query. In an embodiment, the list is pre-selected, configured by an administrator, restricted to specific search sources, non-restricted, or any combination thereof. In an embodiment, one or more search engines 108 comprise a large language model (LLM), public search engines, company internal search engines, knowledge articles database, secured company documents search, language translation engine, file or records database, or the like.

In an embodiment, search results 110 comprises obtaining one or more search results from the one or more search engines 108. In an embodiment, search results 110, such as images, are provided to a user device that is participating and using the streaming application 102 to cause one or more user devices to display the images while using the streaming application 102. In at least one embodiment, search results 110 comprise a meaning, definition, explanation, or clarification for portions of data described in search queries. In another embodiment, search results comprise illustrations, photos, video, audio, articles, websites and related content, or similar results.

In an embodiment, some or all of the processes of system 100 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process of system 100 may be performed by any suitable system, such as the computing device 500 of FIG. 5.

Figure 2:
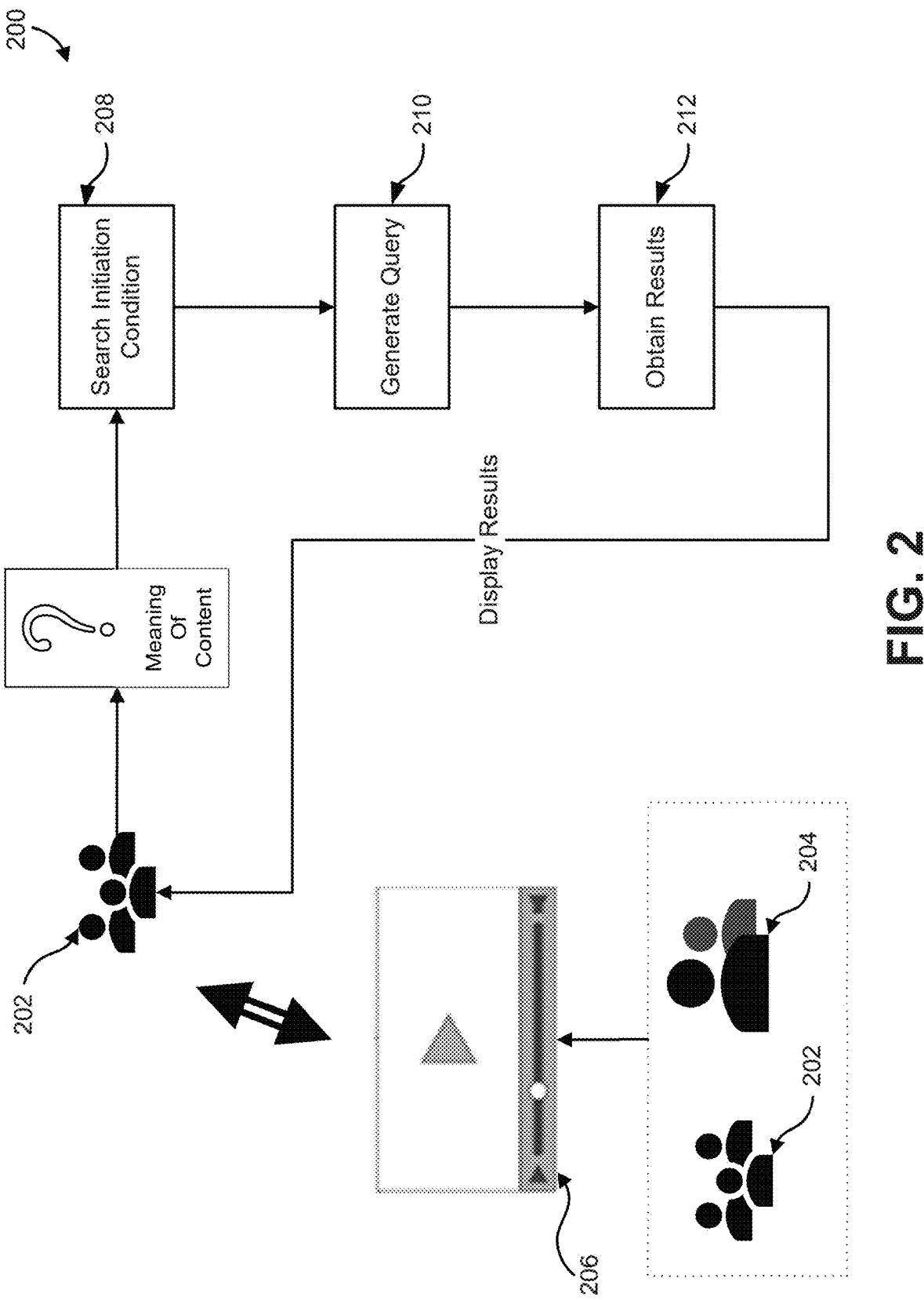
FIG. 2 illustrates a diagram of a system that enables users to access content search functionality from within a streaming application, in accordance with an embodiment.

FIG. 2 is a block diagram illustrating a process 200 that enables users to access content search functionality from within a streaming application, in accordance with an embodiment. In at least one embodiment, process 200 enables one or more users 202 attending a live stream presentation using a streaming application 206, delivered by a presenter 204, to search for information relating to content delivered by the presenter 204 and obtain the results of the search without leaving the live stream presentation. In an embodiment, process 200 comprises a streaming application 206, which is the same streaming application described in conjunction with FIG. 1. In at least one embodiment, process 200 also includes one or more users 202, one or more presenters 204, a search initiation condition 208, query generation 210, and results 212. In at least one embodiment, process 200 enables users 202 which are attending a presentation given by presenters 204 in streaming application 206, to search for information related to content. The search is triggered by satisfaction of search initiation condition 208.

And results 212 are obtained from a search conducted based on a generated query 210, without the user 202 having to exit or minimizing the streaming application 206. In at least one embodiment, software is implemented and when executed, perform at least a part of process 200 such that users 202 and presenters 204 can utilize a content search functionality while also using streaming application 206.

In an embodiment, a user 202 of a streaming application 206 seeks to find a meaning or definition of content and selects portions of data from the steaming application 206. As described elsewhere herein, the data can be selected from a log file, from highlighting text from a transcript generated by the streaming application, and/or using a playback recording from the audio data. Once the data is selected, process 200 determines that the content satisfies one or more search initiation conditions 208. For example, when a user 202 selects portions of data from a transcript generated by a streaming application 206, a search initiation condition 208 is satisfied at the point the user 202 selects the data. In another embodiment, software in the streaming application 205 is configured to automatically identify data to perform a search on. For example, during a streaming session, a presenter 204 delivers content relating to a topic which the software has been configured to recognize, such as keywords, names, images, or technical description, and then the software selects the last five seconds of content (or any arbitrary timeframe (e.g., 3 seconds, 10 seconds, etc.)) in which the keywords were mentioned, and passes the content to an NLP framework to be transformed into searchable content.

In an embodiment, users 202 include computing devices that receive instructions from one or more individuals. For example, an individual who attends a live-stream webinar using the streaming application 206, via a computing device, over a network, would be a user. In an embodiment, users 202 comprise clients, devices, servers, computers, people or groups of people, robots, artificial intelligence, autonomous vehicles, audiences, presenters, support agents, actors, any combination thereof, or any other relevant user described or implied herein in conjunction with an embodiment. In an embodiment, presenters 204 comprise users of a streaming application who are also presenting information in the same streaming application. For example, an individual delivering a presentation in the live-stream webinar on a topic to an audience, from a computer, over a network, would be a presenter 204. In an embodiment, a presenter can be a user, and a user can also be a presenter. In an embodiment, users 202 and presenters 204 can be using and presenting at the same time, for all or part of the total time participating in a streaming application session. In an embodiment, presenters 204 comprise clients, devices, servers, computers, people or groups of people, robots, artificial intelligence, autonomous vehicles, audiences, presenters, support agents, actors, any combination thereof, or any other relevant user described or implied herein in conjunction with an embodiment. In an embodiment, streaming application 206 comprises software which enables live streaming of content by one or more users. In an embodiment, streaming application 206 is the same streaming application 102 described in conjunction with FIG. 1 above and FIGS. 3-5 below.

In an embodiment, search initiation condition 208 comprises a trigger to cause identification of a portion of data from a data streaming application 206. In an embodiment, satisfaction of a search initiation condition 208 causes one or more portions of data to be selected for processing. The selected data is then input into an NLP framework (such as the NLP framework described above in FIG. 1) to generate one or more search queries. In an embodiment, search initiation condition 208 is triggered, based, at least in part, on user input as discussed in FIG. 1 above. For example, a user 202 attending a presentation on a topic may observe an image on the screen and select the image as the content to be searched. In an embodiment, the user's selection of the image would satisfy the search initiation condition 208, and the selected image would then be converted, via a NLP framework, to searchable format and a search query would be generated 210. In an embodiment, the generated search query 210 comprises information or context about the content of the image, the image itself, words or text contained in the selected image, and/or a series of search queries to obtain as much information about the image as possible. For example, if the selected image contains a hiking boot, the search queries generated could comprise information about the manufacturer of the boot based on a text logo printed on the boot, what environments such boots were designed for hiking in based on the design of the boot, where to purchase the boot and an average cost of the boot from various searches. In an embodiment, search engines can be specified via a configuration 106 (as described in FIG. 1 above) and determined that are capable of conducting the searches based on the selected content.

In another embodiment, search initiation condition 208 is triggered without user input as discussed in FIG. 1 above. For example, one or more keywords or data is preconfigured to trigger identification of the portions of data comprising those keywords or data, when they are used during a streaming session. In keeping with the hiking boot example discussed in the paragraph above, in an embodiment, an image of the hiking boot may be presented during the streaming session, and the streaming application, while executing the software, may identify the hiking boot based on search initiation condition 208, which have been preconfigured to detect images of hiking boots. The system may select, convert, and generate search queries 210 automatically without the need for user input. For example, the search queries generated could comprise tailored information about the hiking boot, and the results obtained 212 from the search could be automatically displayed to the audience or users or the streaming application as pop-ups, subtitles, chat messages, bubbles on the screen, and/or similar displays.

In another embodiment, the search initiation condition 208 could be configured to identify the portions of data similar to and/or related to any user-selected data, or pre-configured key terms. For example, when a keyword is spoken by a presenter at a certain time, the portions of data 5 seconds before and after the keyword are also identified and used as input to an NLP framework as context or relevant information about the user-selected data or keyword. For example, where a search initiation condition 208 is configured to identify all mentions of the term "polynomial," the software is configured to select data in the 5 seconds before and after the mention of the key term, to provide context on what type of polynomial is being discussed.

In an embodiment, where search initiation condition 208 is triggered based on user input, the condition comprises a keystroke or series of keystrokes, an audio trigger, a hand gesture (e.g., sign language), a body movement (e.g., eye motion or head nod), a pre-selected word or series of words defined by the user, a sound or series of sounds defined by a user, any combination thereof, or any other relevant user input. In an embodiment, where search initiation condition 208 is triggered without user input, the condition comprises words, sentences, paragraphs, sounds, images, data, time periods, triggering events (e.g., progress quizzes or evaluations in the streaming application), a keystroke or series of keystrokes executed by random participants in a streaming application, button clicks executed as part of a series of operations required for participation in a streaming session, any combination thereof, or any other relevant condition which functions independent of user input.

In an embodiment, an NLP framework generates a search query 210 by transforming select content from the streaming application 206. In an embodiment, selections based on user input comprise selections in response to a prompt, highlighting, screen-grabbing, and/or recording by a user, any combination thereof, or any other selection process described herein. In an embodiment where portions of data a selected independent of user input, selections comprise extracting words, sentences, paragraphs, letters, numbers, sounds, images, video frames, objects, variables, equations, binary, code, transforms, hashes, or any combination thereof, based at least in part on pre-configured settings. In embodiments where selections are independent of user input, a user may still be prompted to confirm, amend, or cancel the selection.

In an embodiment, a portion of data from a streaming application 206 from which a user may select can be defined as within a scope. For example, the scope is a time period of a set number of seconds before and after a search initiation condition is triggered. In another embodiment, the scope is a word-count, paragraph count, or letter count. In yet another embodiment, the scope is timestamp at a point or points during a streaming session. In an embodiment, a portion of data from a streaming application 206 comprises a text transcript, audio, video, image data, files or documents, any combination thereof, or any other relevant data associated a streaming application 206 such as code or instructions to be executed by one or more processors.

In an embodiment, portions of data selected from a streaming application 206 can be in various formats, such as audio, log files, video, or similar, and must be transformed into a format from which a search query can be generated to be executed by a search engine. In various embodiments, data delivered in streaming applications have varying formats and are transformed into a format which can be utilized by an NLP to generate a search query 210. For example, data transformed using NLP techniques is utilized to generate a search query 210 that can be executed by one or more search engines. The transformation of the data can be dependent on the search engine to be used to satisfy the selected content. In an embodiment, identified and selected portions of data from a data streaming application are transformed to text and then a search query is generated using NLP techniques. In an embodiment, NLP techniques are used to extract information from portions of data, and generate sentiment analysis, classification, summarization, context associated with the data, and/or pattern identification. In an embodiment, the search query is generated based, at least in part, on the text. In an embodiment, the text is based on the portions of data from the data streaming application identified based on a search initiation condition and selected based on user input or independent of user input, as described in paragraphs above.

In an embodiment, search queries generated 210 are to be executed by one or more search engines (as described in FIG. 1 above). For example, queries 210 are provided to a public search engine and results are obtained. In an embodiment, the one or more search engines are a coordinated set of programs that searches for the definition, meaning, or information related to the portions of data. In an embodiment, a search engine is a specialized content search engine, such as for encrypted data, or one that only searches an intranet, specified file directory, knowledge base, or database. In an embodiment, the search engine is an artificial intelligence powered search engine. In an embodiment, the search engine selected to execute is accessible to a user or presenter. In another embodiment, the search engine selected is only available to users meeting certain conditions or authorized to use.

In an embodiment, one or more search results 212 are obtained once the one or more search queries are to be executed by one or more search engines. In an embodiment, one or more search engines execute a generated query 210 to generate search results (sometimes referred to herein as results 212). In an embodiment, the results 212 comprise information associated with portions of data from a data streaming application, and obtaining the results 212 enables a user of a streaming application to enable one or more other users to explore the results 212 without leaving the live stream. In an embodiment, results 212 comprises a definition of the portion of data. In an embodiment, results 212 comprise a meaning associated with the portion of data from a streaming application. In at least one embodiment, results 212 are presented to one or more users or presenters within the streaming application. In an embodiment, results 212 are displayed in a streaming application, via a user computing device, as a pop-up, tooltip, embedded links, feature window, comment, headline, subtext, footnote, code, numerical representation, image, video, audio, any combination thereof, or any other relevant form of displaying content in a streaming application.

In an embodiment, some or all of process 200 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 200 may be performed by any suitable system, such as the computing device 500 of FIG. 5.

Figure 3:
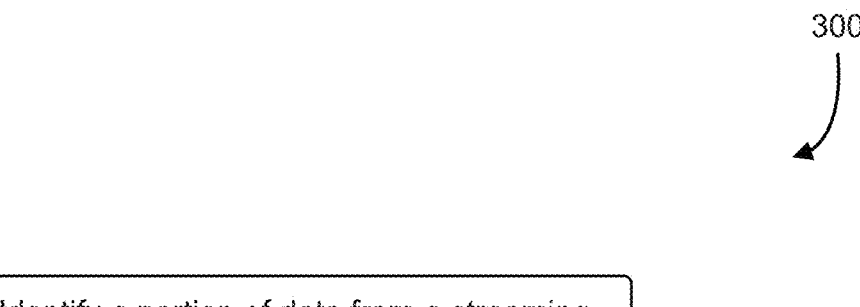
FIG. 3 illustrates a flow chart of a system in which are portions of data are identified, transformed into searchable context, and search results are obtained from a search to be executed by a search engine, in accordance with an embodiment.
Figure 3:
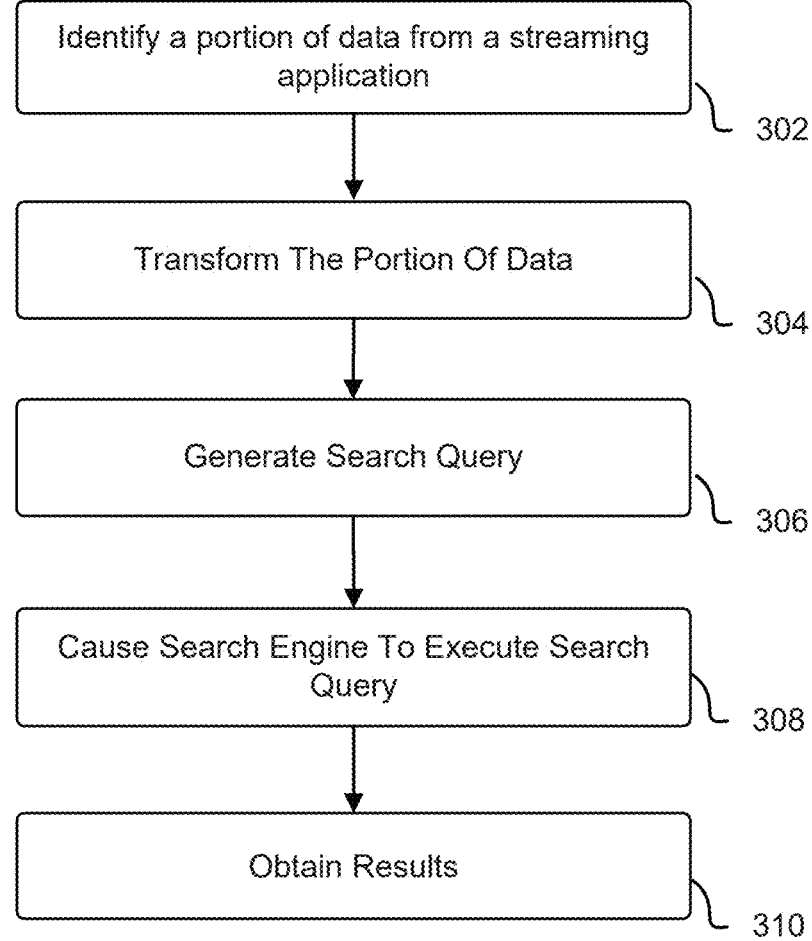

FIG. 3 illustrates a flowchart of a process 300 in which portions of data are identified, transformed into searchable context, and search results are obtained from a search executed by a search engine, in accordance with an embodiment. In at least one embodiment, a processor performs one or more steps 302-310 in process 300 using one or more computing systems such as the computing device 500 of FIG. 5.

In at least one embodiment, at step 302, a processor comprising one or more circuits are to execute instructions to identify portions of data from a streaming application. For example, portions of data are identified when a user triggers a search initiation condition, such as inputting "CTRL-ALT-Left Arrow" and portions of data may then be obtained when a user highlights text from a transcript generated by the streaming application in response to the search initiation condition trigger. In an embodiment, portions of data are selected by a user and the selection triggers a satisfaction of a search initiation condition. For example, a search initiation condition comprises a pre-configured list of keywords, and when a user selects a keyword that matches a keyword in the pre-configured list, a search imitation condition is satisfied. In an embodiment, keywords can also be identified when spoken by a user or presenter during a streaming session.

Once an identification is made as described above, in accordance with an embodiment, the search initiation condition is determined to be satisfied and the portions of data are selected and passed on for transformation.

In an embodiment, at step 304, a processor causes portions of data to be transformed using various language processing techniques. For example, obtained data is passed to an NLP framework (such as the NLP framework discussed in FIG. 1 above) to be transformed into a format usable by a computing device. For example, NLP framework transforms an audio recording into text. In an embodiment, at step 306, a processor causes the NLP framework to generate a search query. For example, a search query comprising a sentence is generated to be executed by one or more search engines based, at least in part on the NLP transformed text form a video clip. In an embodiment, at step 308, a processor provides a search query to a search engine to be executed. For example, a search query is provided as input to a knowledge article search engine on a company website or webserver. In an embodiment, at step 310, a processor obtains results from one or more searches conducted by one or more search engines. In an embodiment, the results obtained relate to a definition of portions of data, such as defining a technical term or explaining the purpose for variables of a mathematical formula. In at least one embodiment, obtained results are further provided to one or more user devices to be displayed to a user in a streaming application as described in conjunction with FIGS. 1-2 above.

In another embodiment, portions of data are transformed at step 304 using Large Language Modelling (LLM). LLM's can be useful for processing language-related tasks in certain situations, in accordance with an embodiment. For example, the portion of data selected comprises an entire paragraph or page of text which is processed to distill the page of text down to a format which can generate one or more relevant search queries reflecting the subject discussed in the paragraph or page. In another embodiment, the portion of data selected comprises language from a specialized field such as medical, legal, or engineering. In yet another embodiment, the portion of data selected comprises proprietary terminology which a general NLP framework may not be able to translate, but a specialized LLM could process. In an embodiment, transforming portions of data according to techniques described above and below comprises generating text from audio, video, or computer language data such as binary or code. In an embodiment, transforming portions of data comprises translating human speech into a form which can be understood by a computer. In an embodiment, transforming portions of data comprises assigning context to text based on the association between portions of data from a streaming application, and the topic or field of the streaming application. In an embodiment, portions of data from a streaming application are transformed into text which can be understood by a user and/or presenter.

In an embodiment, at step 306, a processor causes the NLP framework to generate a search query. In an embodiment, to generate one or more search results about content selected by a user, or selected independent of user input, transformation of the content into another format may be needed to generate a proper search query. For example, where the content selected comprises an image, the content could be processed into a search query format (e.g., text) which can be input to a search engine. In another embodiment, where the content selected comprises video frames, the content may be processed to generate an image search query, or a search query comprising a sound clip. In an embodiment, the generated search query is based, at least in part, on text which has been transformed using various techniques described above. In an embodiment, the search query is generated based, at least in part, on the search engine that is selected to execute the search. In an embodiment, the search query is used by one or more search engines to generate one or more search results as described in paragraphs above and below.

In an embodiment, at step 308, a processor provides a search query that is to be executed by a search engine. In an embodiment, search queries generated as described at step 306 are passed from a streaming application running software executing process 300 to a search engine hosted by a server or computing resource separate from the server or computing resource hosting the streaming application. In an embodiment, the user who triggered the search for information about portions of data from a streaming application is not required to leave the streaming application when the system provides the search query to the search engine to be executed. In an embodiment, where a search is triggered automatically, independent of user input, generated search queries can also pass automatically, independent of user input, to a search engine. In another embodiment, generated search queries are passed to search engines selected by a user from a list of search engines, in response to a prompt. In yet another embodiment, search queries may only be executed by a specified search engine, or by one or more search engines defined by the configurations of the streaming application. For example, process 300 includes configuring search engines to execute search queries according to configuration 106 in FIG. 1.

In an embodiment, a search engine is the same search engine as described in conjunction with FIGS. 1 and 2 above. For example, it is one or more publicly available search engines. In yet another embodiment, the search engine is one or more intranet or enterprise searches. In an embodiment, any search engine may be specified by a configuration, such as configuration 106 of FIG. 1, to execute one or more generated queries. In an embodiment, a different search engine may be specified to execute each of the one or more search queries separately. In at least one embodiment, the search engine is restricted to searching only specified documents, materials, or information that are defined by configuration 106 of FIG. 1.

In an embodiment, at step 310, a processor obtains results associated with a search query that has been executed by one or more search engines. In an embodiment, the results obtained comprise a definition or information relating to a portion of data from a data streaming application. In an embodiment, one or more search results obtained are based, at least in part, on content related to the portion of data. In an embodiment, content related to the portion of data comprises individual letters, timestamps, time counts, word counts, sentences, paragraphs, sounds, images, video frames, context, pre-configured settings associated with the subject matter of a streaming session, formulas, variables, log files, computer language, any combination thereof, or any other relevant content related to portions of data described herein. In at least one embodiment, obtained search results are further displayed to the user in a streaming application as described in conjunction with FIGS. 1-2 above.

In an embodiment, some or all of process 300 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 300 may be performed by any suitable system, such as the computing device 500 of FIG. 5. In at least one embodiment, one or more steps in process 300 are otherwise combined, performed in series, and/or performed in parallel. In at least one embodiment, logic (e.g., hardware, software, or a combination of hardware and software) performs process 300.

Figure 4:
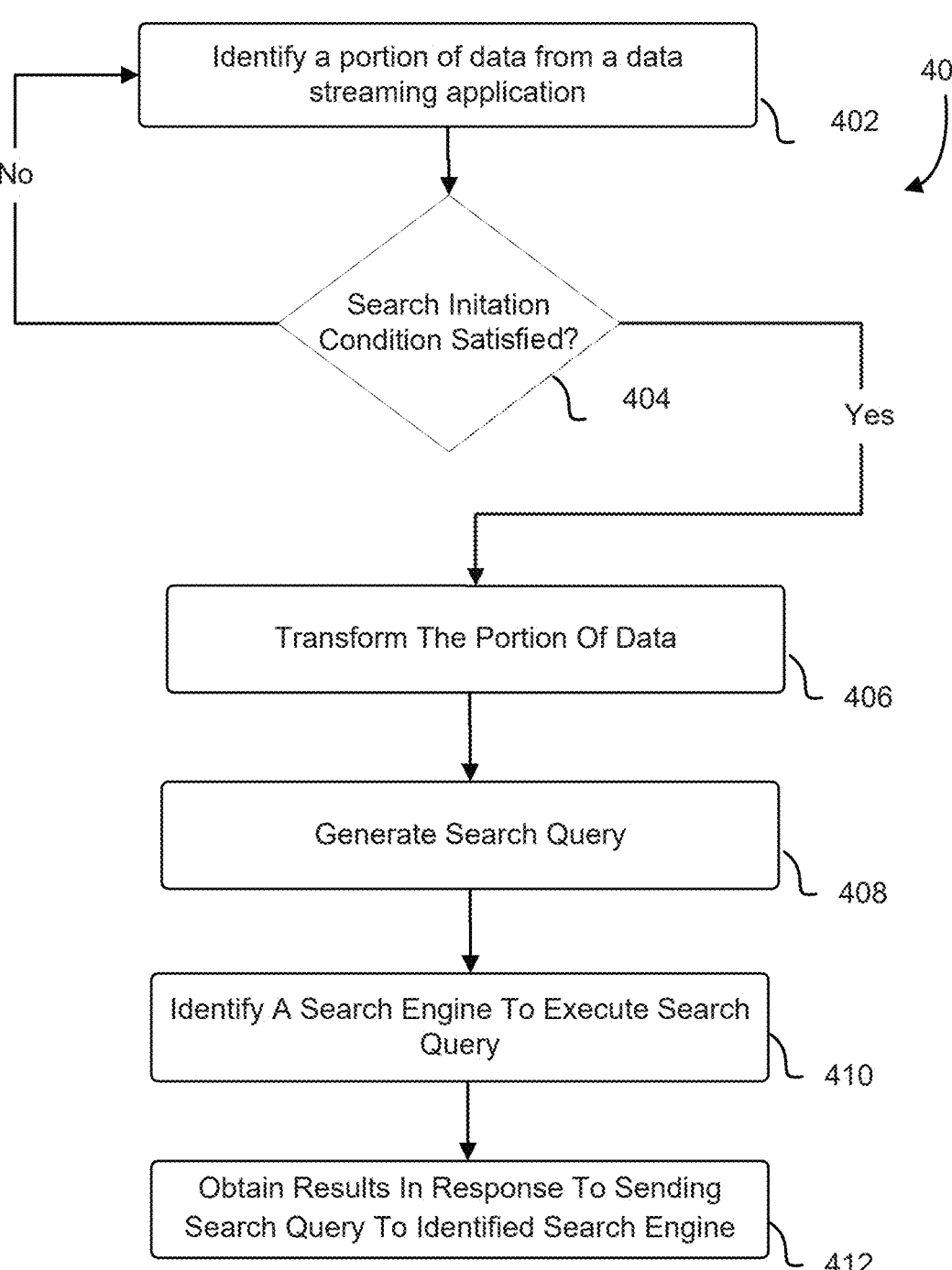
FIG. 4 illustrates a flow chart of a system in which portions of data are identified based, at least in part, on satisfaction of a search initiation condition, in accordance with an embodiment.

FIG. 4 is a flowchart which illustrates process 400 of a system in which portions of data are identified based, at least in part, on satisfaction of a search initiation condition, in accordance with an embodiment. In at least one embodiment, a processor performs one or more steps 402-412 in process 400 using one or more computing systems such as the computing device 500 of FIG. 5.

In at least one embodiment, process 400 illustrates identifying portions of data from a streaming application, selecting and transforming portions of data using various language processing techniques, generating a search query to be executed by one or more search engines, and obtaining results from the searches conducted by the search engines. In an embodiment, once portions of data are identified according to a triggered search initiation condition, process 400 must determine if the search initiation condition is satisfied before generating a search query, as discussed below.

In an embodiment, at step 402, a processor identifies portions of data from a streaming application to determine whether a search initiation condition is satisfied. For example, the search initiation condition is triggered by a user typing a series of keys on a keyboard. In an embodiment, the identification of data according to triggering of a search initiation condition is as described in accordance with FIGS. 1 and 2 above. In an embodiment, some or all of the process 400 at step 402 is the same as process 300 at step 302.

In an embodiment, at step 404, a processor determines whether a search initiation condition is satisfied. In an embodiment, satisfaction of a search initiation condition causes an affirmative value to be generated, and the next steps of process 400 to process. In an embodiment, where the search initiation condition is not satisfied, a negative value is generated and process 400 restarts at the beginning at step 402. In an embodiment, only data which satisfied the search initiation condition is selected for transformation by an NLP framework (the same NLP framework as discussed above in FIG. 1). For example, when a user types a series of keystrokes, the user may then select by highlighting or otherwise identifying specific portions of data. In an embodiment, the search initiation condition could comprise a user's desire for additional information associated with a specific term. In another embodiment, the condition could comprise a time-window within which all content is selected. In another embodiment, the condition could comprise a combination of a time window and a pre-configured list of keywords. For example, one word appearing on the list may have triggered the identification, but all words from the search initiation condition list, which are discussed within the window of time, will satisfy the search initiation condition. That is, in an embodiment where a list of keywords is to automatically trigger identification of portions of data, the search initiation condition is satisfied by all words appearing on the list. Even if only one word triggers the identification of data, all specified words appearing within the time window will be selected according to an embodiment. In another embodiment, the search initiation condition comprises user input, automatic actions institution independent of user input, words, letterings, sentences, sounds, images, timestamps, any combination thereof, or any other condition discussed herein. In an embodiment, satisfaction of a search initiation condition results in, causes, or otherwise enables portions of data from a data streaming application which have been identified, to be selected for transformation using various language processing techniques.

In an embodiment, at step 406, a processor causes the NLP framework to transform the portions of data using various language processing techniques, such as NLP techniques or LLM techniques, as discussed in conjunction with FIGS. 1-3 above. In an embodiment, transforming portions of data according to techniques described above comprises generating text from audio, video, or computer language data such as binary or code. In an embodiment, transforming portions of data comprises translating human speech into a form which can be understood by a computer. In an embodiment, transforming portions of data comprises assigning context to text based on the association between portions of data from a streaming application, and the topic or field of the streaming application. In an embodiment, portions of data from a streaming application are transformed into text which can be understood by a user and/or presenter.

In an embodiment, at step 408, a processor causes the NLP framework to generate a search query. In an embodiment, only content which has satisfied the search initiation condition at step 404 is processed to generate a search query. In another embodiment though, all data determined to be relevant to the portion of data satisfying the search initiation condition is processed to generate a search query. For example, when a user triggers a search initiation condition with a keystroke at step 402, the user may select any data which they determine to be relevant to the search. In another embodiment, where a single word triggers a search initiation condition, only that word is selected to be processed to generate the search query. In at least one embodiment, the search query is generated based, at least in part, on the search engine which will be executing the search. In an embodiment, the search query is used by one or more search engines to generate one or more search results as described above.

In an embodiment, at step 410, a processor identifies a search engine where the search query that is generated, at step 408 will be sent to. In an embodiment, search queries generated as described at step 408 are passed from a streaming application running software executing process 400 to a search engine separate the streaming application. In an embodiment, an identified search engine at step 410 is the same search engine as described in conjunction with FIGS. 1-3 above. In an embodiment, one or more search engines may be specified by a configuration, such as configuration 106 of FIG. 1, to execute one or more generated search queries. In an embodiment, a different search engine may be specified to execute each of the one or more search queries. In at least one embodiment, the search engine is restricted to searching only specified documents, materials, or information which may be defined by a configuration such as configuration 106 of FIG. 1.

In an embodiment, at step 412, a processor obtains results in response to a search query sent and to be executed by one or more identified search engines. In an embodiment, the results obtained comprise a definition or information relating to a portion of data from a streaming application. In an embodiment, one or more search results obtained are based, at least in part, on content related to the portion of data. In an embodiment, content related to the portion of data comprises articles, hyperlinks, individual letters, timestamps, word counts, academic papers, exemplary illustrations, audio, images, video frames, context, formulas, variables, log files, computer language, any combination thereof, or any other relevant content related to portions of data described herein. In at least one embodiment, obtained search results are further displayed to the user in a streaming application as described in conjunction with FIGS. 1-3 above.

In an embodiment, some or all of process 400 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system, such as system 500 of FIG. 5. In at least one embodiment, one or more steps in process 400 are otherwise combined, performed in series, and/or performed in parallel. In at least one embodiment, logic (e.g., hardware, software, or a combination of hardware and software) performs process 400.

Figure 5:
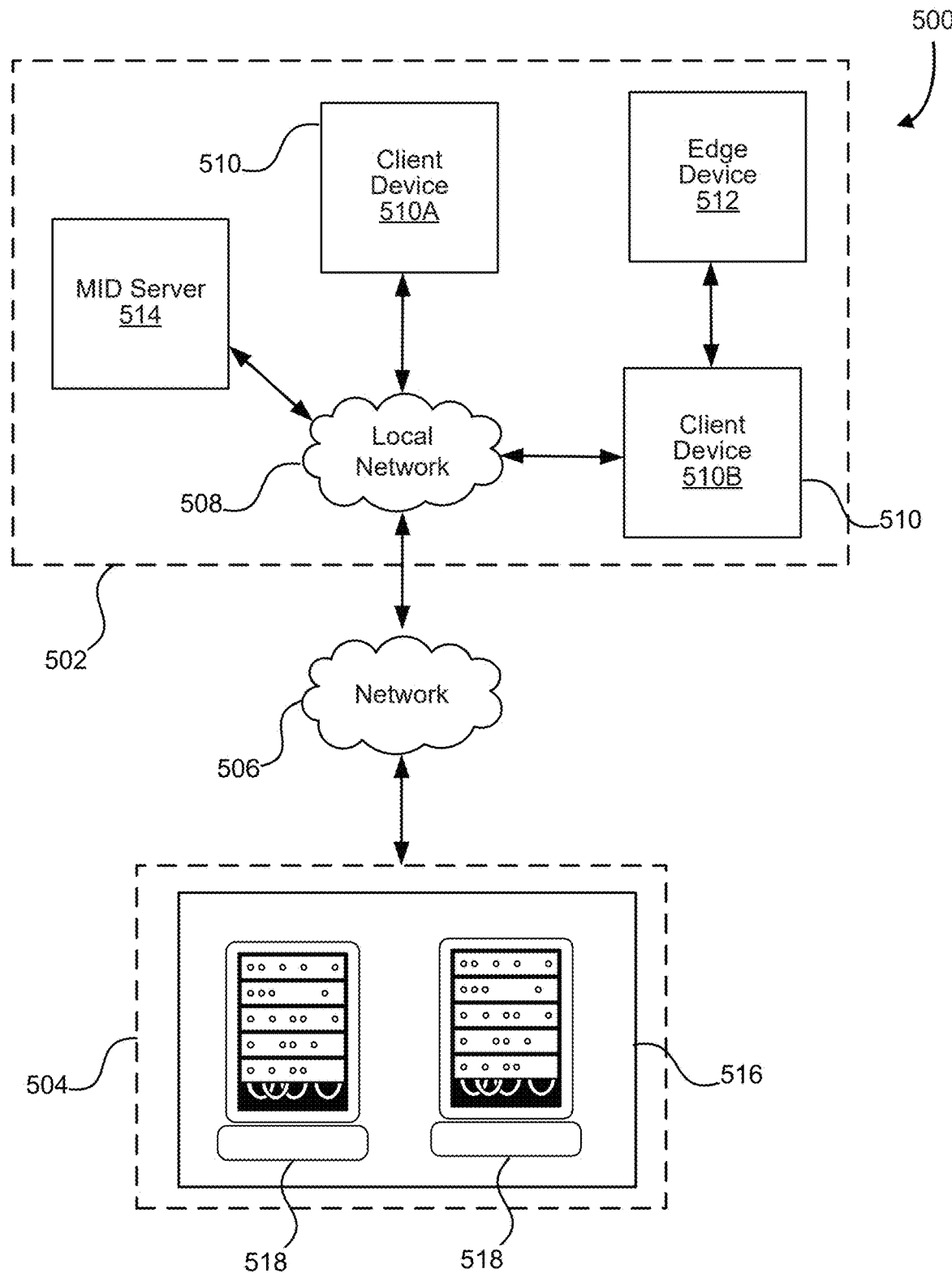
FIG. 5 illustrates a system in which various embodiments can be implemented.

FIG. 5 illustrates a system 500 in which various embodiments can be implemented. The system 500 may include a client network 502 and a provider platform 504 that are operably connected via a network 506 (e.g., the Internet). In an embodiment, the client network 502 may be a private local network 508, such as a local area network (LAN) that includes a variety of network devices that include, but are not limited to, switches, servers, and routers. In an embodiment, the client network 502 can comprise an enterprise network that can include one or more LANs, virtual networks, data centers, and/or other remote networks. In an embodiment, the client network 502 can be operably connected to one or more client devices 510 such as example client device 510A, 510B so that the client devices 510 are able to communicate with each other and/or with the provider platform 504. In an embodiment, the client devices 510 can be computing systems and/or other types of computing devices generally referred to as Internet of Things (IoT) devices that can access cloud computing services, for example, via a web browser application or via an edge device 512 that may act as a gateway between one or more client devices 510 and the platform 504 (e.g., second client device 510B). In an embodiment, the client network 502 can include a management, instrumentation, and discovery (MID) server 514 that facilitates communication of data between the network hosting the platform 504, other external applications, data sources, and services, and the client network 502. In an embodiment, the client network 502 may also include a connecting network device (e.g., a gateway or router) or a combination of devices that implement a customer firewall or intrusion protection system.

In an embodiment, the client network 502 can be operably coupled to the network 506, which may include one or more suitable computing networks, such a large area network (LAN), wide area networks (WAN), the Internet, and/or other remote networks, that are operable to transfer data between the client devices 510 and the provider platform 504. In an embodiment, one or more computing networks within network 506 can comprise wired and/or wireless programmable devices that operate in the electrical and/or optical domain. For example, network 506 may include wireless networks, such as cellular networks (e.g., Global System for Mobile Communications (GSM) based cellular network), WIN networks, and/or other suitable radio-based networks. The network 506 may also employ any suitable network communication protocols, such as Transmission Control Protocol (TCP), Internet Protocol (IP), and the like. In an embodiment, network 506 may include a variety of network devices, such as servers, routers, network switches, and/or other suitable network hardware devices configured to transport data over the network 506.

In an embodiment, the provider platform 504 may be a remote network (e.g., a cloud network) that is able to communicate with the client devices 510 via the client network 502 and network 506. In an embodiment, the provider platform 504 can comprise a configuration management database (CMDB) platform. In an embodiment, the provider platform 504 provides additional computing resources to the client devices 510 and/or the client network 502. For example, by utilizing the provider platform 504, in some examples, users of the client devices 510 can build and execute applications for various enterprise, IT, and/or other organization-related functions. In one embodiment, the provider platform 504 can be implemented on the one or more data centers 516, where each data center 516 can correspond to a different geographic location in some examples. In an embodiment, one or more the data centers 516 includes a plurality of servers 518 (also referred to in some examples as application nodes, virtual servers, application servers, virtual server instances, application instances, application server instances, or the like), where each server 518 can be implemented on a physical computing system, such as a single electronic computing device (e.g., a single physical hardware server) or across multiple-computing devices (e.g., multiple physical hardware servers). Examples of servers 518 can include a virtual server, a web server (e.g., a unitary Apache installation), an application server (e.g., a unitary Java Virtual Computer), and/or a database server.

To utilize computing resources within the provider platform 504, in an embodiment, network operators may choose to configure the data centers 516 using a variety of computing infrastructures. In an embodiment, one or more of the data centers 516 can be configured using a multi-instance cloud architecture to provide every customer with its own unique customer instance or instances. For example, a multi-instance cloud architecture of some embodiments can provide each customer instance with its own dedicated application server and dedicated database server. In some examples, the multi-instance cloud architecture could deploy a single physical or virtual server 518 and/or other combinations of physical and/or virtual servers 518, such as one or more dedicated web servers, one or more dedicated application servers, and one or more database servers, for each customer instance. In an embodiment of a multi-instance cloud architecture, multiple customer instances can be installed on one or more respective hardware servers, where each customer instance is allocated certain portions of the physical server resources, such as computing memory, storage, and processing power. By doing so, in some examples each customer instance has its own unique software stack that provides the benefit of data isolation, relatively less downtime for customers to access the platform 504, and customer-driven upgrade schedules.

In some embodiments, the provider platform 504 includes a computer-generated data management server that receives, via network 506 and/or an internal network within or across different data centers, computer-generated data for storage and analysis. For example, log entries can be sent from client devices/servers 510, MID server 514 (e.g., agent server acting as the intermediary in client network 502 to facilitate access to client network 502 by the network hosting the platform 504), and/or servers in data centers 516 to a log management server in data centers 516.

Although FIG. 5 illustrates a specific embodiment of a cloud computing system 500, the disclosure is not limited to the specific embodiments illustrated in FIG. 5. For instance, although FIG. 5 illustrates that the platform 504 is implemented using data centers, other embodiments of the platform 504 are not limited to data centers and can utilize other types of remote network infrastructures. Some embodiments may combine one or more different virtual servers into a single virtual server. The use and discussion of FIG. 5 are only examples to facilitate ease of description and explanation and are not intended to limit the disclosure to the specific examples illustrated therein. In an embodiment, the respective architectures and frameworks discussed with respect to FIG. 5 can incorporate suitable computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

At least one embodiment of the disclosure can be described in view of the following clauses:

1. A method comprising:
   identifying a portion of data from a data streaming application based on the portion of data satisfying a search initiation condition;
   transforming the portion of data to text via natural language processing (NLP);
   generating a search query, based at least in part on the text, to be executed by one or more search engines; and
   obtaining one or more search results from the one or more search engines based on the search query.

2. The method of clause 1, wherein the one or more search results comprise a definition of the portion of data.

3 The method of clause 1, wherein the one or more search results comprise content related to the portion of data.

4. The method of clause 1, wherein the data from the data streaming application comprises audio data.

5. The method of clause 1, wherein the search initiation condition is based, at least in part, on user input.

6. The method of clause 1, wherein the search initiation condition is based, at least in part, on the portion of data from the data streaming application and independent of user input.

7. The method of clause 1, further comprising causing the one or more search results to be displayed in the data streaming application.

8. A system comprising:
   one or more processors; and
   memory including computer-executable instructions that, if executed by the one or more processors, cause the system to:
   identify a portion of data from a data streaming application based on the portion of data satisfying a search initiation condition;

transform the portion of data to text via natural language processing (NLP);

generate a search query, based at least in part on the text, to be executed by one or more search engines; and obtain one or more search results from the one or more search engines based on the search query.

9. The system of clause 8, wherein the one or more search results comprise a definition of the portion of data.

10. The system of clause 8, wherein the one or more search results are generated based, at least in part, on content related to the portion of data.

11. The system of clause 8, wherein the data from the data streaming application comprises data from a log file associated with the data streaming application.

12. The system of clause 8, wherein the one or more processors cause one or more keywords in the portion of data to be identified to satisfy the search initiation condition.

13. The system of clause 8, wherein the search initiation condition is satisfied based, at least in part, on the portion of data from the data streaming application.

14. The system of clause 8, wherein the one or more processors are to cause one or more user devices to receive the one or more search results while using the data streaming application.

15. A non-transitory computer-readable storage medium having stored thereon executable instructions which, when executed by one or more processors of a computer system, cause the computer system to:

identify a portion of data from a data streaming application based on a search initiation condition;

transform the portion of data to text via natural language processing (NLP);

generate a search query, based at least in part on the text, to be executed by one or more search engines; and obtain the one or more search results from the one or more search engines based on the search query.

16. The non-transitory computer-readable storage medium of clause 15, wherein the one or more search results comprise a meaning of the portion of data.

17. The non-transitory computer-readable storage medium of clause 15, wherein the one or more search results are generated to include content related to the portion of data.

18. The non-transitory computer-readable storage medium of clause 15, wherein the data from the data streaming application comprises data from a video conference.

19. The non-transitory computer-readable storage medium of clause 15, wherein the search initiation condition is satisfied based, at least in part, on user selection of the portion of data.

20. The non-transitory computer-readable storage medium of clause 15, wherein the one or more search results are provided as one or more images to a user device.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—For example, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A method comprising:
receiving an indication of a search initiation condition associated with a data streaming application, the search initiation condition comprising a keystroke, a series of keystrokes, a video input to a device displaying the data streaming application associated with a defined movement of a body, an audio input to the device displaying the data streaming application associated with a defined sound, or any combination thereof;
generating a log file comprising data from the data streaming application based on the search initiation condition;
identifying a portion of data in the log file based on the portion of data being within a word count of the indication of the search initiation condition, a paragraph count of the search initiation condition, a letter count of the search initiation condition, or a threshold amount of time from a timestamp corresponding to the indication of the search initiation condition;
transforming the portion of the data to text via natural language processing (NLP);
generating a search query, based at least in part on the text, to be executed by one or more search engines; and
obtaining one or more search results from the one or more search engines based on the search query.

2. The method of claim 1, wherein the one or more search results comprise a definition of the portion of data.

3. The method of claim 1, wherein the one or more search results comprise content related to the portion of data.

4. The method of claim 1, wherein the data from the data streaming application comprises audio data.

5. The method of claim 1, further comprising causing the one or more search results to be displayed in the data streaming application.

6. The method of claim 1, wherein the portion of data from the data streaming application comprises an image or one or more video frames.

7. The method of claim 6, wherein the portion of data from the data streaming application comprises words or text contained in the image or the one or more video frames.

8. A system comprising:
one or more processors; and
memory including computer-executable instructions that, if executed by the one or more processors, cause the system to:
receive an indication of a search initiation condition associated with a data streaming application, the search initiation condition comprising a keystroke, a series of keystrokes, a video input to a device displaying the data streaming application associated with a defined movement of a body, an audio input to the device displaying the data streaming application associated with a defined sound, or any combination thereof,
generate a log file comprising data from the data streaming application based on the search initiation condition;

identify a portion of data in the log file based on the portion of data being within a word count of the indication of the search initiation condition, a paragraph count of the search initiation condition, a letter count of the search initiation condition, or a threshold amount of time from a timestamp corresponding to the indication of the search initiation condition;

transform the portion of data to text via natural language processing (NLP);

generate a search query, based at least in part on the text, to be executed by one or more search engines; and obtain one or more search results from the one or more search engines based on the search query.

9. The system of claim 8, wherein the one or more search results comprise a definition of the portion of data.

10. The system of claim 8, wherein the one or more search results are generated based, at least in part, on content related to the portion of data.

11. The system of claim 8, wherein the computer-executable instructions, when executed by the one or more processors, further cause the one or more user devices to receive the one or more search results while using the data streaming application.

12. The system of claim 8, wherein the computer-executable instructions, when executed by the one or more processors, further cause the system to identify the one or more search engines from a plurality of search engines, wherein the transformation of the data is based on the identified one or more search engines.

13. The system of claim 8, wherein the computer-executable instructions, when executed by the one or more processors, further cause the system to:

determine a context associated with the data streaming application; and generate the search query, based on the text and the context.

14. The system of claim 11, wherein the computer-executable instructions, when executed by the one or more processors, further cause the one or more user devices to display the one or more search results in the data streaming application by causing the one or more user devices to display a pop-up, a feature window, a headline, a subtext, a footnote, an image, a video, or any combination thereof.

15. A non-transitory computer-readable storage medium having stored thereon executable instructions which, when executed by one or more processors of a computer system, cause the computer system to:

receive an indication of a search initiation condition associated with a data streaming application, the search initiation condition comprising a keystroke, a series of keystrokes, a video input to a device displaying the data streaming application associated with a defined movement of a body, an audio input to the device displaying the data streaming application associated with a defined sound, or any combination thereof;

generate a log file comprising data from the data streaming application based on the search initiation condition;

identify a portion of data in the log file based on the portion of data being within a word count of the indication of the search initiation condition, a paragraph count of the search initiation condition, a letter count of the search initiation condition, or a threshold amount of time from a timestamp corresponding to the indication of the search initiation condition;

transform the portion of data to text via natural language processing (NLP);

generate a search query, based at least in part on the text, to be executed by one or more search engines; and obtain one or more search results from the one or more search engines based on the search query.

16. The non-transitory computer-readable storage medium of claim 15, wherein the one or more search results comprise a meaning of the portion of data.

17. The non-transitory computer-readable storage medium of claim 15, wherein the one or more search results are generated to include content related to the portion of data.

18. The non-transitory computer-readable storage medium of claim 15, wherein the data from the data streaming application comprises data from a video conference.

19. The non-transitory computer-readable storage medium of claim 15, wherein the one or more search results are provided as one or more images to a user device.

20. The non-transitory computer-readable storage medium of claim 15, wherein the portion of data from the data streaming application is confirmed based on a selection of data after the indication of the search initiation condition.

* * * * *